Patented Apr. 7, 1942

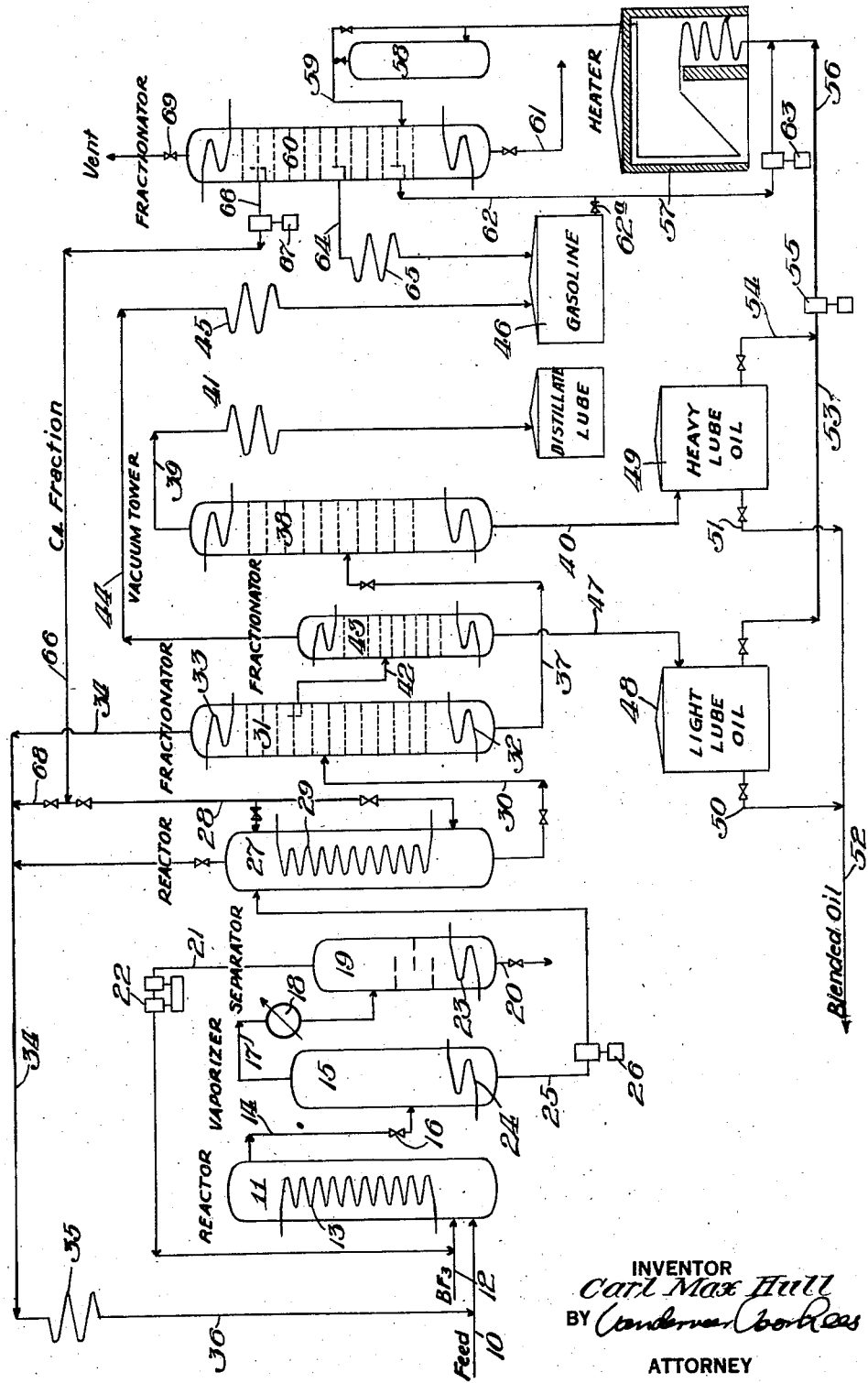

2,278,445

UNITED STATES PATENT OFFICE 2,278,445

PRODUCING POLYMERIZED OILS

Carl Max Hull, Chicago, Ill., assignor to Standard Oil Company, Chicago, Ill., a corporation of Indiana Application October 8, 1938, Serial No. 233,971

12 Claims. (Cl. 196—10)

This invention relates to the conversion of hydrocarbon gases into useful oils and particularly lubricating oils and gasoline. One of the objects of the invention is to convert the butane-butylene fraction of cracking still gases into high quality lubricating oils and motor fuels. Another object of the invention is to obtain more complete polymerization of the unsaturated constituents of the four carbon atom fraction by means of a catalyst and at the same time obtain efficient utilization of the catalyst. Other objects of the invention will be set forth hereinafter.

The invention is illustrated by a drawing which shows diagrammatically a complete layout for carrying out the process. Referring to the drawing a liquefied normally gaseous hydrocarbon stream is introduced by line 10 into reaction chamber 11. The hydrocarbon stream may suitably comprise a mixture of butanes and butylenes derived from the fractionation of cracking still gases. As an example of such a mixture, I may use one containing about 10 to 20% of isobutylene, about 20 to 30% of normal butylene and the remainder mostly isobutane and normal butane. The gases may be washed with caustic soda or other reagent to remove $H_2S$ or other sulfur compounds they may contain and with dilute acid to remove basic substances such as amines.

In the reactor 11, there is also introduced by line 12 a stream of catalyst preferably boron fluoride. However, boron chloride and other catalytically active, volatile metal halides may be employed, the common characteristic of the catalysts being that they are readily decomposed by water. The temperature of the reaction mixture in chamber 11 may be controlled by cooling coil 13, a suitable temperature being between 0 and 100° F., for example, 40° F. In the reaction chamber 11, the isobutylene contained in the hydrocarbons is completely polymerized by the catalyst which is used in slight excess, the reaction requiring about 5 to 30 minutes. The amount of catalyst may be suitably about 0.1 to 2% of the weight of the total hydrocarbons treated, 0.2 to 0.5% being commonly employed.

The reaction products and excess catalyst are conducted by line 14 to vaporizer 15. The pressure may be suitably reduced by valve 16, thus permitting a major portion of the hydrocarbon gases to vaporize along with excess catalyst. The combined vapors are conducted by line 17 to condenser 18 where the hydrocarbon vapors are largely condensed. The condensate is separated from the catalyst vapors in separator 19. Liquid $C_4$ hydrocarbons are withdrawn by line 20 and may be added to gasoline to adjust its vapor pressure, while catalyst vapors are withdrawn by line 21 leading to compressor 22 which circulates the unused catalyst back to the reaction chamber 11. Traces of catalyst are expelled from the liquefied butane in separator 19 by means of heating coil 23. Heating coil 24, likewise, assist in evaporating the catalyst and butanes in vaporizer 15.

The unevaporated reaction product in vaporizer 15 is withdrawn by line 25 and pump 26 to reaction chamber 27. In reaction chamber 27 complex compounds of boron fluoride are caused to react with additional amounts of isobutylene supplied through line 28. The reaction may be facilitated by employing a higher temperature than in reaction chamber 11, for example temperatures up to 200° F. but preferably 50–100° F., the temperature being controlled by coil 29. The higher temperatures tend to produce relatively larger amounts of material in the gasoline boiling range. By employing an excess of isobutylene in chamber 27 most of the remaining boron fluoride catalyst is used up in the process. The reaction product may, if desired, be washed free of the last trace of catalyst, for example with sodium carbonate, and then conducted by line 30 to fractionator 31. Heat is supplied to fractionator 31 by coil 32 and reflux by reflux cooling coil 33. The hydrocarbon gases are discharged at the top by line 34 leading to condenser 35 and thence by line 36 and line 10 back to the first reaction chamber 11. Excess isobutylene withdrawn from reaction chamber 27 is thus recycled to the first reaction chamber where it is completely polymerized to higher hydrocarbons.

The heavy polymers are withdrawn from the bottom of fractionator 31 by line 37 and conducted to fractionating tower 38 wherein the heavy oils are separated into a lubricating distillate withdrawn by line 39 and a heavy residual polymer withdrawn by line 40. It is preferred to operate fractionator 38 under a vacuum of about 3 to 50 mm. mercury pressure. The lubricating distillate vapors are condensed in condenser 41 and the distillate may be used as a lubricating oil for internal combustion engines. It is especially valuable for the lubrication of Diesel engines because of its freedom from carbonization within the engine. It is preferred to conduct the distillation in fractionators 31 and 38 to produce a Diesel lubricating distillate having a viscosity within the range of S. A. E. 20 to S. A. E. 50. The oil is characterized by a gravity of about 32° A. P. I. It is wax free and the pour point is about —30° F. for the 30 S. A. E. grade. The viscosity index is about 80 to 95. Oils within the viscosity range of 30 to 40 S. A. E. are preferred.

An intermediate fraction is withdrawn from the tower 31 by line 42 and further distilled in stripper 43. A gasoline fraction is distilled off as vapor and conducted by line 44 to condenser 45 leading to receiver 46. The heavier fraction is withdrawn by line 47 leading to receiver 48. The heavy lubricating oil in line 40 is collected in receiver 49 and part or all of it may be blended with lighter oil to produce a superior blended lubricating oil for shock absorbers and other uses where an oil of high viscosity index is required. Thus oil may be drawn from receivers 48 and 49 by lines 50 and 51 respectively and blended in line 52. Following are the characteristics of such a blend:

| | |
|---|---|
| Viscosity at 100° F_____sec. Saybolt__ | 1486 |
| Viscosity at 210° F_____do____ | 114 |
| Viscosity index_____ | 100 |
| Flash_____°F__ | 250 |
| Pour point_____°F__ | —30 |
| Gravity_____A. P. I__ | 31.0 |
| Color_____N. P. A__ | 1 |

The production of distillate lubricating oil and gasoline may be augmented by recycling the light and/or heavy fractions, or both, in the manner to be described. Oil is drawn from receiver 48 by line 53 and/or from receiver 49 by line 54 leading to pump 55. The oil stream then flows by line 56 to decomposing heater 57 where it is heated to a suitable temperature for decomposition, usually within the range of 750 to 1000° F. and preferably about 850 to 950° F. The time of heating may vary from a few seconds to several minutes. For example, with a contact time of 10 to 100 seconds and a temperature of 929° F. at atmospheric pressure, the product contained 20 to 30% of C₄ fraction, largely isobutylene. If the polymer oil, particularly the lighter oil, is heated for a longer time, lower temperatures may be used. Thus, at 600 to 610° F., 21% decomposition occurred in 23 minutes. The product was distilled at 440° F. and 4 mm. mercury pressure after which the residue was again decomposed to the extent of 23% in 35 minutes. If desired, a catalyst may be employed in drum 58 to accelerate the decomposition of the oil. Suitable catalysts are activated bentonate, fuller's earth, or aluminum oxide adsorbed on silica gel, employed at about 400° F. to 600° F. I may also use boron fluoride as a catalyst in which case the boron fluoride may be introduced into the coil of heater 57 or into catalyst chamber 58. Lower temperatures of the order of 200 to 400° F. are sufficient when using this active catalyst. Repolymerization of olefinic products occurs on cooling and these may be separated into desired fractions in fractionator 60. As a result of the heating, the oil is largely depolymerized to form isobutylene and other hydrocarbons of intermediate boiling point. The decomposition products are conducted by line 59 to fractionator 60 where they are separated into vapors and liquids. The unvaporized portion is discharged from the system by line 61 and may be used to make further quantities of lubricating oil. Partial depolymerization of the heavy oil from 49 may thus be made to yield increased amounts of the Diesel lubricating oil of lower viscosity. Intermediate oils unsuited for gasoline or Diesel lubricating oil are collected by a trap-out plate and recycled by line 62 and pump 63 back to the decomposing furnace. Gasoline fractions may be separated in the upper part of fractionator 60 and withdrawn by line 64 leading to cooler 65 and receiver 46. Although not usually desirable to do so, gasoline may also be recycled to the depolymerizing furnace by valved line 62a. Isobutylene and other four carbon atom hydrocarbons are withdrawn by line 66 leading to pump 67 whence they are discharged either into reaction chamber 27 by line 28 or by line 68 directly into recycle line 34. Lighter hydrocarbon gases and other fixed gases are discharged from the system by vent 69. Instead of combining the light and heavy oils from 48 and 49 before depolymerization in heater 57, we may decompose them separately in separate coils under optimum conditions for each oil and combine the products in drum 58 or fractionator 60.

One of the important features of my process is the production of a gasoline of high knockrating coincident with the production of valuable lubricating oils. The gasoline which is collected in receiver 46 will typically have a knock-rating of about 75 to 90 octane number (C. F. R. motor method), and this may be increased for use in high compression aviation engines by subjecting it to suitable hydrogenation. Another important feature of my process is the utilization of both isobutylene and normal butylene while producing lubricating oil of high viscosity index at the same time.

Much of the recycle isobutylene may be polymerized in reaction chamber 27 under conditions suitable for production of high viscosity index lubricating oil. Thus the temperature in reaction chamber 27 may be maintained at about 25 to 40° F. Temperatures within this range or a higher reaction temperature may be maintained in chamber 11, e. g., 50 to 100° F. Also, a higher concentration of catalyst will be present in chamber 11 as a result of which considerable co-polymerization of isobutylene and normal butylene takes place with the formation of valuable high knock-rating motor fuels. Likewise, a portion of the normal butylene combines with isobutane under the influence of the catalyst to form saturated hydrocarbons of high knock-rating.

Although I have described my process with respect to certain embodiments thereof, I intend that it be limited only by the following claims.

I claim:

1. The process of producing lubricating oils by polymerizing olefin hydrocarbons contained in a hydrocarbon gas mixture comprising subjecting said hydrocarbon gas mixture in liquid phase in a first polymerization stage to the action of an excess amount of boron fluoride catalyst capable of forming a complex compound with olefin hydrocarbons whereby the major portion of said olefin hydrocarbons is polymerized and a substantial portion of said excess catalyst forms a complex compound with said hydrocarbons, removing unreacted hydrocarbon gases from said complex compound and polymerization products, treating in a second stage said complex compound with additional olefin gases in excess whereby substantially all of said catalyst complex is decomposed and additional polymerization products are produced, introducing said excess gases into said first polymerization stage and distilling said polymerization products to separate therefrom the desired lubricating oil fraction.

2. The process of claim 1 wherein said desired lubricating oil fraction is withdrawn as an intermediate boiling distillate oil having a viscosity within the range of S. A. E. 20 to 50, remaining polymerization products are subjected to thermal decomposition, and gaseous olefins produced by said decomposition are recycled to said polymerization operation.

3. The process of claim 1 wherein the gas mixture employed in the second stage contains isobutylene.

4. The process of claim 1 wherein from about 0.1% to about 2% of catalyst, by weight, based on the weight of the hydrocarbons, is employed.

5. The process of claim 1 wherein from about 0.2% to about 0.5% of catalyst, by weight, based on the weight of the hydrocarbons, is employed.

6. In the process of polymerizing olefin hydrocarbons contained in hydrocarbon gas mixtures by the action of a boron fluoride catalyst capable of forming a complex compound with said hydrocarbons the improvement comprising treating in a first stage said olefin hydrocarbon mixture in liquid phase with said catalyst whereby polymerization products and catalyst complex are formed, separating unreacted hydrocarbons from the mixture of said polymerization products and catalyst complex, treating in a second stage said mixture of polymerization products and catalyst complex with an excess amount of additional liquefied hydrocarbon gases containing olefins in a higher concentration than that of the gas mixture first mentioned whereby said catalyst contained in said complex is substantially exhausted introducing said excess of hydrocarbons into said first stage and thereafter recovering desired polymerization products from unreacted hydrocarbons.

7. The process of claim 6 wherein a portion of the said polymerization products having an undesirable viscosity is decomposed into unsaturated hydrocarbon gases containing a high concentration of olefin hydrocarbons and said unsaturated hydrocarbon gases are introduced into said second stage polymerization step.

8. In the process of converting butylenes into lubricating oils of intermediate viscosity within the range of about 20 to 50 S. A. E. wherein a mixture of butylenes and butanes is employed as the starting material, the improvement comprising subjecting said mixture of butanes and butylenes in liquid form to the action of a polymerizing catalyst in two stages whereby said butylenes are substantially converted to heavier hydrocarbon polymer products and catalyst complex in a first stage, removing butanes and unreacted butylenes from said polymer products, polymerizing additional liquid butylenes by said complex in a second stage, separating from said polymer products the desired intermediate viscosity lubricating oil, subjecting the remaining polymers to dissociation at an elevated temperature whereby butylene is produced, and recycling said butylene to said second polymerization stage.

9. The process of claim 8 wherein the lighter than desired polymer products are dissociated separately from the heavier than desired polymer products.

10. The process of claim 8 wherein the dissociation of said undesired polymer products is effected by heating to a temperature within the range of 750 to 1000° F.

11. The process of claim 8 wherein the polymer products, freed of catalyst, are distilled to remove a motor fuel fraction, a light distillate lubricating oil fraction, a heavy distillate lubricating oil fraction of intermediate viscosity, and a residual lubricating oil fraction, and a portion of said light lubricating oil fraction is blended with a portion of said heavy lubricating oil fraction to produce a second blended lubricating oil as a product of the process.

12. The process of converting unsaturated hydrocarbon gases into lubricating oils and gasoline which comprises separating from said gases a fraction consisting essentially of hydrocarbons of four carbon atoms containing normal butylene, isobutylene, normal butane and isobutane, treating said four carbon atom fraction in liquid phase with an excess of boron fluoride catalyst whereby said isobutylene is substantially entirely converted into lubricating oils and gasoline by polymerization and part of said normal butylene combines with said isobutane, evaporating unreacted four carbon atom hydrocarbons from residual catalyst, gasoline and lubricating oil products, treating said products with an excess of additional olefin hydrocarbon gases whereby the residual catalyst remaining in said products is substantially exhausted in polymerizing said olefins to produce further polymerization products, distilling said products to separate lubricating oils and gasoline therefrom, fractionating said products to yield a distillate lubricating oil fraction having a viscosity within the range of S. A. E. 20 to S. A. E. 40, subjecting remaining lubricating oil fractions to decomposition by heat whereby olefin hydrocarbon are regenerated and recycling said regenerated olefin hydrocarbons to said second polymerization step.

CARL MAX HULL.